Figure 1:
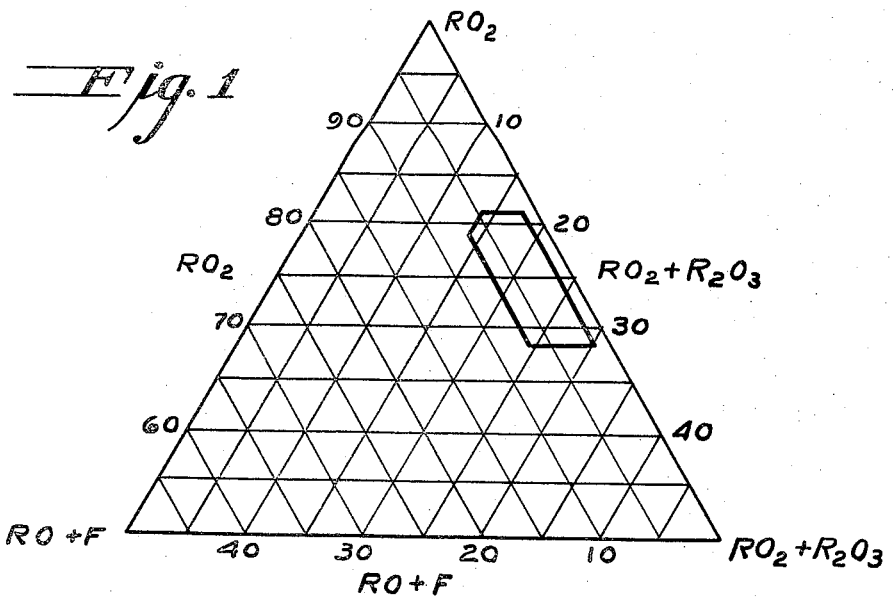

Sept. 15, 1964  R. O. VOSS  3,148,994
GLASS-CERAMIC BODIES AND METHOD OF MAKING
Filed June 20, 1962

INVENTOR.
RAYMOND O. VOSS
BY Clarence R. Patty, Jr.
ATTORNEY

United States Patent Office 3,148,994
Patented Sept. 15, 1964

3,148,994
GLASS-CERAMIC BODIES AND METHOD
OF MAKING
Raymond O. Voss, Corning, N.Y., assignor to Corning
Glass Works, Corning, N.Y., a corporation of New
York
Filed June 20, 1962, Ser. No. 203,922
6 Claims. (Cl. 106—39)

This invention relates to a means for increasing the strength of glass-ceramic bodies.

The manufacture of glass-ceramics or semicrystalline ceramic bodies, as they have frequently been termed, involves the controlled crystallization of a glass in situ. This controlled crystallization usually contemplates the addition of a nucleating or cystallization-promoting agent to a glass-forming batch, melting the batch, simultaneously shaping and cooling the melt into a glass body, and thereafter heat treating the resultant shape following a critical time-temperature schedule. This heat treatment causes the glass shape to be converted into a body composed of fine-grained crystals randomly oriented and dispersed substantially uniformly throughout a glassy matrix and comprising a major portion of the mass of the body. The semicrystalline makeup of the body usually results in physical properties differing considerably from those of the original glass. However, because it is originally a glass, the body can be formed into almost any configuration using the conventional methods of shaping glass, e.g., blowing, casting, drawing, pressing, or spinning. Furthermore, the crystallization of the glass in situ enables the production of substantially homogeneous bodies of fine-grained crystals which are essentially free of voids and non-porous.

Glass-ceramics, although a relatively new development in the glass industry, have been found to possess such physical properties as to make them eminently useful in radomes, electrical insulators, and dinnerware. The strength, hardness, and, often, the resistance to thermal shock of the semicrystalline body are much greater than that of the base glass.

Nevertheless, a means for lending even higher strengths to the bodies has been sought. In the manufacture of dinnerware and cooking utensils, a material of high strength and resistance to impact is demanded. There is a direct correlation between strength and resistance to impact such that an improvement in strength in turn improves the resistance of the body to impact. It will be appreciated that where the inherent strength of a material is low, i.e., the material is relatively sensitive to failure through impact, this characteristic can be offset, to a degree, by increasing the wall thickness of a given shape. Thus, in dinnerware, a serving plate having thicker dimensions is much less prone to breakage through mechanical shock than a thin one. Likewise, in cooking ware, thicker-walled pans and other utensils exhibit greater resistance to impact than those having thin walls. However, this expedient, though useful, is considered unsatisfactory from several aspects: (1) it requires the use of more material, thus increasing the cost of the product; (2) it requires close control of tolerances in forming to insure a minimum wall thickness throughout the configuration of the article; (3) it limits the stlying possibilities of an article which factor is of extreme importance in a product such as dinnerware; and (4) it results in a heavier product for a given level of impact resistance than would be required with a stronger material.

It is, therefore, the primary object of the invention to provide a glass-ceramic body exhibiting exceptionally high strength and resistance to impact which is particularly useful as dinnerware and cooking ware.

It is another object of this invention to provide a method of making a glass-ceramic body exhibiting exceptionally high strength and resistance to impact, which is relatively simple and economical in operation and which can be practiced using apparatus and techniques well-known to the glass industry.

We have discovered that these objects can be attained where a minor amount of fluorine is incorporated in glass-forming batches of very limited composition ranges.

In the manufacturing of glass-ceramic dinnerware and cooking ware, there are several physical and chemical properties which must be present in the material to furnish a practical product. Besides the high strength and impact resistances discussed above, the material should have a low coefficient of thermal expansion so as to demonstrate good resistance to thermal shock. The material should display little distortion during heat treating. Durability, i.e., resistance to acids and alkalies encountered in foods, soaps, and detergents must be high. The surface of the finished ware is preferably glossy. It will be appreciated that, although a combination of optimum measurements of each of these properties would be ideal, in actual practice an improvement in one property frequently results in a reduction in another. Thus, the most advantageous compromise is worked out. This is the situation here. Durability and strength appear to be mutually exclusive with regard to heat treating. Higher temperatures and longer time schedules tend to increase strength to some extent, but have a very deleterious effect on cooking and detergent durability. Likewise, distoration of the shapes during heat treating is magnified where higher temperatures are employed. Where mass production of ware is envisioned, faster and faster heat treating cycles are desired. Thus, more wave can be manufactured but at a sacrifice in strength.

These factors led to the development of glasses giving the best combination of these properties composed essentially by weight, of about 65–75% $SiO_2$, 0.1–2.0% total of at least one alkali metal oxide of the group consisting of $Na_2O$ and $K_2O$, 1–4% $Li_2O$, 1–4% MgO, 15–25% $Al_2O_3$, 0.5–2.0% ZnO, and 3–6% $TiO_2$. Semicrystalline bodies made from these glasses following heat treating schedules designed to yield a body of high strength developed abraded modulus of rupture strengths ranging from 22,000–27,000 p.s.i. However, upon the desire for greater production rates, faster heat treating schedules were introduced. These reduced strengths to 12,000 p.s.i. and often lower. Where the product was being manufactured through a pressing operation, this lower strength was of little concern as the wall thickness of the ware could be increased sufficiently to offset the loss. However, the production of blown ware, with its recognized unevenness in distribution in wall thickness, quickly indicated the need for higher strength. Blown ware, particularly in the larger sizes, normally has a bottom which is thicker than necessary but a top or neck portion which is much thinner. This has resulted in disturbingly frequent chipping, breaking, and cracking of the ware in this area due to mechanical shock.

This factor has lead to the production of thicker walled pieces. However, it has been recognized that a better solution to the problem would be the development of an inherently stronger glass-ceramic.

As the physical properties, other than strength, of glass-ceramics made from glasses of the above-cited compositions were so useful, it was desired to retain them but yet increase the strength. I have found that the addition of 0.1–1.2% by weight of fluorine to the glass composition generally increases the strength of the heat treated body two to three times and in some cases even more. Nevertheless, the expansion, chemical durability, and resistance to distortion are not seriously affected. That is to say, we have discovered that by incorporating 0.1–1.2% by weight of fluorine in a glass falling within the compositional limits set out above which is thereafter subjected to a critical heat treatment, a semicrystalline ceramic body of high strength and impact resistance with good chemical durability, low thermal expansion, and which shows little distortion after the heat treatment can be attained.

My invention comprises melting a batch for a glass composition consisting essentially, by weight, of 65–75% $SiO_2$, 1–4% $Li_2O$, 1–4% MgO, 15–25% $Al_2O_3$, 0.5–2% ZnO, 3–6% $TiO_2$, 0.1–2% total of at least one alkali metal oxide of the group consisting of $Na_2O$ and $K_2O$, and 0.1–1.2% F., simultaneously cooling and shaping the melt into a glass body, the cooling being sufficiently rapid to prevent crystallization and continued to at least below the transformation point of the glass, i.e., the temperature at which the liquid melt is deemed to have been transformed into an amorphous solid, generally in the vicinity of the annealing point of the glass (a temperature of about 650°–700° C. for glasses of this invention), thereafter raising the temperature to at least about 750° C., but not higher than about 1200° C., maintaining this temperature for a time sufficient to attain the desired crystallization, after which the semicrystalline body is cooled to room temperature.

However, in the preferred practice of my invention, a three-step heat treating schedule is employed. Thus, after the melt has been cooled and shaped, the glass body is heated to about 750°–850° C., held thereat for about ½–3 hours, the temperature of the body then raised to about 1050°–1090° C., maintained thereat for about ½–2 hours, the temperature of the body finally raised to about 1100°–120° C., and held thereat for about 1–16 hours. The first heating period is designed to initiate nucleation while the latter two steps increase and greatly expedite the crystallization. The crystallization of the glass during the heat treating cycle proceeds more rapidly as the temperature approaches the liquidus of the crystalline phase. Nonetheless, in the beginning stages of crystallization, the ratio of glassy matrix to crystals is very large and the article is deformable if its temperature is raised too rapidly. The hold at the lower temperature initiates crystallization and provides the body a measure of strength so that distortion and deformation will be minimized as the temperature is raised above the softening point of the glass. Although the difference in temperatures between the second and third heat treating steps is relatively small, laboratory tests and actual production runs have affirmed that finer crystal growth is obtainable where the temperature is held at the second level for a period of time, rather than taking the body directly to the final heat treating.

Numerous variations in method from my preferred practice are possible. After the melt is cooled and shaped into a glass body, the body may be continued to be cooled to room temperature, thereby permitting inspection, before commencing the heat treating schedule. However, in the interest of economies in fuel costs, the melts are usually cooled to just below the transformation point only and the heat treating begun immediately, unless the ware is to be decorated. In such instances, the articles are cooled to room temperature, inspected, decorated, and then subjected to heat treatment.

I have learned that very sasisfactory semicrystalline ceramic bodies can be formed where the preferred three-step heat treatment is replaced with a gradual, but relatively constant, increase in temperature from room temperature or just below the transformation point to temperatures within the 750°–1250° C. range. The body may be held at a specific temperature for a time sufficient to assure the development of the desired crystallization to be attained. Nevertheless, when the rate of heating is relatively gradual and the final temperature near the upper limit of the heat treating range, no holding period will be necessary. This embodiment of my invention permits a continuous-type operation.

Experience has demonstrated that the rate of heating during the heat treating process, which can be sustained by glass bodies is usually dependent upon two factors: the thermal shock resistance of the bodies and the speed of crystallization within the bodies. It is obvious that a rapid rate of heating would be desirable from a commercial aspect and the comparatively low thermal expansion coefficients of the glass compositions of this invention has permitted relatively rapid heating rates to be employed. However, as was explained above, the glass article must be heated above the transformation point in order to initiate crystallization, after which the article is normally raised to a still higher temperature to expedite and increase crystallization. As the glass article is raised above the transformation point, softening of the body occurs and distortion occurs. The softening point and, hence, the deformation or distortion temperature of the semicrystalline ceramic body is substantially higher than the original glass. Therefore, the rate of temperature rise must be in balance with the rate of internal crystallization or, otherwise, sufficient crystals will not be formed to support the body and slumping due to a lowering of viscosity will render the final crystalline product of limited use.

In my preferred three-step heat treating schedule, I have learned that a temperature increase of approximately 5° C./minute generally assures the optimum density of crystallization. However, as the holding period at the lower temperature initiates crystallization, heating rates of 10° C./minute and 20° C./minute and even higher to the elevated heat treating ranges can be tolerated, particularly where some physical support is given to the articles. The low thermal expansion coefficients of the compositions of this invention allow heating rates greater than 5° C./minute to be used from room temperature to the transformation point, but in the desire to insure against breakage, I prefer to hold with the 5° C./minute rate even here. It is apparent, of course, that an increase in temperature slower than 5° C./minute will also yield satisfactory crystalline products and in the "continuous-type" operation described above, rates as slow as 1° C./minute have been recommended in some instances. Nevertheless, rates of increase between 3°–5° C./minute have produced useable bodies. In all cases, the choice of heating rate is directly related to the speed of internal crystallization.

The broadest embodiment of my invention comprises merely heating the glass article to some temperature above the transformation point and holding thereat for a time sufficient to attain the desired crystallization. Naturally, where the glass body is heated to just above the transformation point, say 750° C., an extremely long holding time, of 24 hours or even longer, is required. Where a higher temperature is employed, the rate of crystallization is more rapid but, here again, the rate of crystallization should preferably substantially balance the rate of deformation of the glass body.

The rate of cooling the semicrystalline ceramic body to room temperature is contingent upon its resistance to thermal shock. The size of the body influences the rate chosen. A cooling rate of 5° C./minute has been found satisfactory under almost all circumstances although much faster rates may be employed with relatively small articles. In many instances, the heat to the heat treating furnace will merely be cut off and the furnace allowed to cool at its own rate.

I have found the composition ranges set out above to be critical in yielding a product eminently suitable for cooking ware and dinnerware. As explained previously, this ware should have a low thermal expansion coefficient, should possess high strength and impact resistance, should exhibit good resistance to acids and alkalies commonly encountered in the preparation of food and detergents used in washing, and should distort but little during heat treatment. Further properties that must be taken into consideration include the ease of melting of the glass, the liquidus temperature of the glass, the viscosity of the glass, the capability of the glass to be firepolished or otherwise worked, the color of the semicrystalline body, and the surface appearance of the finished product. Much experimentaton was conducted to determine glass compositions best meeting these specifications. Such experiments resulted in semicrystalline ceramic bodies made from the above-mentioned narrow range of compositions. Nevertheless, field tests and consumer research indicated that a product possessing higher strength and, thereby, greater resistance to impact would be desirable. Yet, the other advantageous properties of the original materials were wished to be retained. Thus, it was sought to improve upon the strength of the base composition without seriously affecting some other property. I have discovered that the addition of only 0.1–1.2%, by weight, of fluorine substantially increases the strength of the material with little, if any, adverse affect on the other properties.

In the following examples, the batches were compounded, ball milled in some instances to aid in obtaining a homogeneous melt, and then melted at temperatures ranging from 1550°–1600° C. for about 16 hours. The batches were melted in open crucibles, although melts may be made in pots or tanks depending upon the quantity of product desired. The melts were then poured into steel molds and cooled as a glass to room temperature. The glass shapes were then placed in a furnace and heated at the rates indicated in Table I to the temperature of the first level of the heat treating schedule and maintained thereat for a time to initiate nucleation. The furnace was then raised at the same rate to the second level of heat treatment, held thereat for a period of time. The furnace was finally raised at the same rate to the third level of treatment, as set out in Table I, and thereafter allowed to cool to room temperature. The low thermal expansion coefficient of the semicrystalline ceramic body allows rapid temperature changes and some shapes have been removed from the furnace immediately after the third step of the heat treating has been completed and merely cooled in air to room temperature. However, to insure sound articles, a slower cooling rate, i.e., about 5° C./minute was employed or the supply of heat to the furnace merely cut off and the furnace allowed to cool at its own rate with the semicrystalline shapes within.

Table I sets forth examples having the designated glass compositions as analyzed in weight percent on the oxide basis. It will be appreciated that fluorine volatilizes fairly readily at the temperatures required to melt the batch. Therefore, although the exact function of the fluorine in providing the desirable increased strength is not known, it has been learned that the amount remaining in the glass body after melting is critically indicative of the strength of the body. Hence, the amount of fluorine in the original batch must be adjusted to take this volatilization into account, such that the resultant glass will analyze about 0.1–1.2% F. The amount of fluorine so lost depends upon a number of factors such as melting time and temperature, batch materials utilized, and the composition of the resulting melt. The exact percentage of fluorine remaining in the glass can be determined by analysis but it is customarily stated separately from the oxide composition. Analyses of the present glasses indicate that about 60% of the fluorine in the batch remains in the glass when melted in open crucibles.

Although the glasses of this invention possess good melting properties, a very minor amount of a fining agent such as arsenic trioxide ($As_2O_3$) or a sulfate ($SO_3$), often supplied as $Na_2SO_4$ or $Al_2(SO_4)_3$, is added to improve the quality of the glass with regard to seeds. Although substantially all of the fining agent is volatilized off during the melting step, the amounts of each added to the batch are included in Table I to give a complete formulation of each composition.

These factors are illustrated in the following analyses of Example 5, the preferred embodiment of the invention, wherein the batch components are set forth in parts by weight, the composition calculated from the batch on the oxide basis is delineated in weight percent, and the analysis of the glass on the oxide basis is also set forth in weight percent.

| Batch Components | | | Comp. Calculated From Batch | Glass Analysis |
|---|---|---|---|---|
| Petalite | 291.0 | $SiO_2$ | 69.48 | 69.93 |
| Magnesium oxide | 12.6 | $Na_2O$ | 0.4 | 0.4 |
| Sand | 114.5 | $K_2O$ | 0.07 | 0.07 |
| Zinc Oxide | 4.9 | $Li_2O$ | 2.70 | 2.70 |
| Titania | 22.8 | $MgO$ | 2.60 | 2.60 |
| Sodium nitrate | 2.7 | $Al_2O_3$ | 17.8 | 18.02 |
| Alumina | 36.3 | $ZnO$ | 1.0 | 1.0 |
| Aluminum fluoride | 5.7 | $TiO_2$ | 4.7 | 4.8 |
| Aluminum sulfate | 3.8 | $SO_3$ | 0.5 | (0.5) |
| | | F | 0.75 | 0.45 |

As can readily be seen from the above tabulation, the composition as calculated from the batch components is substantially the same as that analyzed in the glass, except for the fluorine content and the loss of the fining agent. Also, it can be observed that but 60% of the fluorine remains in the glass after the batch has been melted. The batch constituents may comprise any materials, either oxides or other compounds, which, on being melted together, are converted to the desired oxide compositions in the necessary proportions.

Table I also records the modulus of rupture (p.s.i.), chemical durability, coefficients of thermal expansion at 0–300° C. ($\times 10^7$), distortion, and capability of being firepolished. The modulus of rupture measurements were obtained by the conventional method using rods which had been abraded with 30 grit silicon carbide. The method of determining the linear thermal expansion coefficient is likewise well known. The test for chemical durability consisted of immersing articles in a 0.3% by weight solution of a commercial detergent held at about 95° C., for a period of 24 hours. After removal from the bath, the surface gloss was compared with a sample of the original material and also with a sample of good chinaware which had been subjected to the same test. In some instances, a penetrating dye was brushed across the surface and the ease with which it could be removed was compared again with good chinaware. The test for distortion comprised supporting a piece of cane having a diameter of about 0.25" and a length of about 5" on two knife edges spaced 4" apart. This setup was placed in the furnace during the heat treating cycle and the slumping from the horizontal was measured in thirty-seconds of an inch at the point of greatest deformation. It will be understood that any firepolishing or other flameworking, which is to be done in shaping the body or smoothing over sharp edges, must be done while the body is a glass and not a semicrystalline body. Unfortunately, some glass compositions crystallize so readily upon the application of a flame that they cannot be satisfactorily firepolished. My test for determining the firepolishing character of these materials consisted of placing objects having sharp rims in a flame typical of those used in firepolishing setups and observing the ease of firepolishing and the extent of induced crystallization. This, again, is a qualitative test but is considered to be very indicative of behavior to be expected in actual production runs.

Table I

| | 1 | 2 | 3 | 4 | 5 | 6 | 7 |
|---|---|---|---|---|---|---|---|
| $SiO_2$ | 69.7 | 69.63 | 70.3 | 69.5 | 69.93 | 70.0 | 69.9 |
| $Na_2O$ | 0.4 | 0.4 | 0.4 | 0.4 | 0.4 | 0.4 | 0.4 |
| $K_2O$ | 0.17 | 0.07 | 0.07 | 0.07 | 0.07 | 0.07 | 0.07 |
| $Li_2O$ | 2.7 | 2.7 | 2.53 | 2.53 | 2.7 | 2.53 | 2.53 |
| $MgO$ | 2.6 | 2.6 | 2.8 | 2.8 | 2.6 | 2.8 | 2.8 |
| $Al_2O_3$ | 17.93 | 17.9 | 17.8 | 18.5 | 18.05 | 18.0 | 18.2 |
| $ZnO$ | 1.0 | 1.0 | 1.0 | 1.0 | 1.9 | 1.0 | 1.0 |
| $TiO_2$ | 4.7 | 4.7 | 4.7 | 4.7 | 4.8 | 4.7 | 4.7 |
| $As_2O_3$ | (0.9) | | | | | | |
| $SO_3$ | | | (0.5) | (0.5) | (0.5) | (0.5) | (0.5) |
| F | | 0.3 | 0.15 | 0.3 | 0.45 | 0.6 | 1.2 |

| Rate of Heating | 5° C./Min. | 5° C./Min. | 5° C./Min. | 5° C./Min. | 5° C./Min. | 5° C./Min. | 5° C./Min. |
|---|---|---|---|---|---|---|---|
| Hrs. | 1 | 1 | ½ | 1 | 1 | 1 | 3 |
| °C. | 780 | 780 | 820 | 780 | 780 | 800 | 750 |
| Hrs. | 1 | 1 | ½ | 1 | 1 | 1 | 2 |
| °C. | 1,080 | 1,080 | 1,090 | 1,080 | 1,080 | 1,075 | 1,080 |
| Hrs. | 4 | 4 | 12 | 4 | 4 | 8 | 4 |
| °C. | 1,120 | 1,120 | 1,180 | 1,120 | 1,120 | 1,100 | 1,140 |
| M.O.R.[1] | 13,000 | 28,000 | 27,200 | 37,500 | 44,600 | 47,000 | 18,700 |
| Exp.[1] | 10.4 | 13.6 | 14.6 | 15.6 | 10.0 | 25.1 | 32.9 |
| Dur.[1] | Better | Good | Good | Good | Good | Good | Fair |
| Dist.[1] | 8/32" | 9/32" | 8/32" | 8/32" | 9/32" | 10/32" | 9/32" |
| Fire.[1] | Better | Good | Good | Good | Better | Better | Better |

| | 8 | 9 | 10 | 11 | 12 | 13 | 14 |
|---|---|---|---|---|---|---|---|
| $SiO_2$ | 69.7 | 69.7 | 69.7 | 69.75 | 69.85 | 70.45 | 69.95 |
| $NaO_2$ | 0.4 | 0.4 | 0.4 | 0.4 | 0.4 | 0.4 | 0.4 |
| $K_2O$ | 0.07 | 0.07 | 0.07 | 0.07 | 0.07 | 0.07 | 0.07 |
| $Li_2O$ | 2.53 | 2.53 | 2.53 | 2.83 | 2.83 | 2.83 | 2.83 |
| $MgO$ | 2.8 | 2.8 | 2.8 | 2.45 | 2.45 | 2.45 | 2.45 |
| $Al_2O_3$ | 17.9 | 17.9 | 17.9 | 17.9 | 17.9 | 18.2 | 18.1 |
| $ZnO$ | 1.0 | 1.0 | 1.0 | 1.0 | 1.0 | 1.0 | 1.0 |
| $TiO_2$ | 4.7 | 4.7 | 4.7 | 4.7 | 4.7 | 4.7 | 4.7 |
| $As_2O_3$ | (0.9) | (0.9) | (0.9) | (0.9) | | | |
| $SO_3$ | | | | | (0.5) | | (0.5) |
| F | 0.3 | 0.6 | 1.2 | | | 0.3 | 0.3 |

| Rate of Heating | 5° C./Min. | 5° C./Min. | 5° C./Min. | 5° C./Min. | 5° C./Min. | 5° C./Min. | 5° C./Min. |
|---|---|---|---|---|---|---|---|
| Hrs. | 1 | 1 | 1 | 1 | 1 | 1 | 1 |
| °C. | 780 | 780 | 800 | 780 | 780 | 780 | 780 |
| Hrs. | 1 | 1 | ½ | 1 | 1 | 1 | 1 |
| °C. | 1,080 | 1,080 | 1,050 | 1,080 | 1,080 | 1,080 | 1,080 |
| Hrs. | 1 | 2 | 14 | 4 | 4 | 4 | 4 |
| °C. | 1,120 | 1,140 | 1,120 | 1,120 | 1,120 | 1,120 | 1,120 |
| M.O.R.[1] | 22,500 | 19,200 | 16,700 | 13,000 | 12,250 | 25,400 | 32,400 |
| Exp.[1] | 10.4 | 16.1 | 36.0 | 10.1 | 10.0 | 9.7 | 9.0 |
| Dur.[1] | Good | Good | Fair | Better | Better | Good | Good |
| Dist.[1] | 10/32" | 9/32" | 18/32" | 9/32" | 8/32" | 10/32" | 7/32" |
| Fire.[1] | Better | Good | Good | Better | Better | Good | Good |

[1] M.O.R.—Modulus of Rupture. Exp.—Expansion. Dur.—Durability. Dist.—Distortion. Fire.—Firepolishing.

The effectiveness of fluorine in increasing the strength of the semicrystalline ceramic bodies of my invention is clearly illustrated in Table I when Examples 1, 11, and 12, containing no fluorine, are compared with the remainder of the examples wherein varying amounts are incorporated. Several generalizations can be drawn from the data. First, Example 3 demonstrates that as little as 0.15%, by weight, of fluorine produces a marked effect on the strength of the bodies herein, while at 1.2% by weight, the prime effect has been exceeded. The optimum quantity appears to be between 0.2 and 0.5%. The use of arsenic trioxide as a fining agent has a definite muffling effect on this increase in strength, while sulfate enhances this characteristic. This has led to the conclusion that sulfate would be the best fining agent for these compositions. I have concluded that Example 5 combines the best properties of strength, expansion, chemical durability, resistance to distortion, and ability to be firepolished and is my preferred composition.

The crystal content of the articles of my invention has been determined to be at least about 30 weight percent, but is generally on the order of 50 weight percent, and preferably even higher. This feature is dependent upon the extent to which the components are adaptable to the formation of crystal phases. The crystals, themselves, are very fine grained, i.e., substantially all finer than about 30 microns in diameter, and are randomly dispersed throughout the glassy matrix.

Although in each of the above examples the glass articles were shaped by pouring the melt into steel molds, it will be appreciated that any of the conventional glass-forming methods such as blowing, pressing, rolling, or spinning is also applicable.

FIG. 1 illustrates the ranges of compositions of RO+F, $RO_2$, $R_2O+R_2O_3$ encompassed in our invention.

Figure 2:
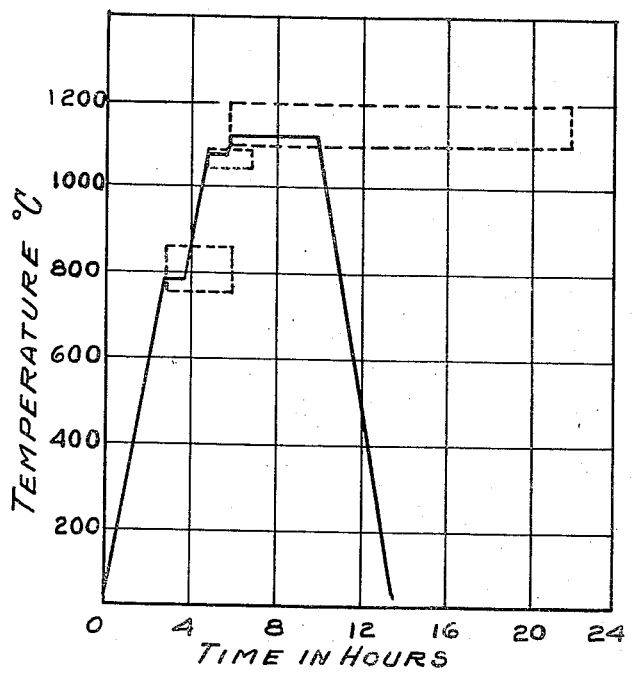

FIG. 2 sets forth a time-temperature curve for the heat treating schedule of my preferred composition, viz., Example 5 of Table I wherein after the batch had been melted, as, for example, by heating in a crucible at 1550° C. for about 16 hours, shaped, and cooled to room temperature, the glass article was given the following heat treatment: The temperature was raised at 5° C./minute to 780° C., maintained thereat for 1 hour, thereafter the temperature was raised at 5° C./minute to 1080° C., maintained thereat for 1 hour, subsequently the temperature was raised at 5° C./minute to 1120° C., maintained thereat for 4 hours, and then cooled at 5° C./minute to room temperature. The areas enclosed within the dotted lines represent the ranges of my preferred three-step process.

What is claimed is:

1. A method of manufacturing a high strength, semi-crystalline ceramic body comprising the steps of melting a batch for a glass composition which, by analysis, consists essentially, by weight, of 65–75% $SiO_2$, 1–4% $Li_2O$, 1–4% $MgO$, 15–25% $Al_2O_3$, 0.5–2.0% $ZnO$, 3–6% $TiO_2$, 0.1–2.0% total of at least one alkali metal oxide of the group consisting of $Na_2O$, and $K_2O$, and 0.1–1.2% F, simultaneously cooling the melt below the transformation point of the melt and shaping a glass body therefrom, thereafter exposing said glass body to a temperature of at least about 750° C., but not over about 1200° C., for a time sufficient to attain the desired crystallization, and then cooling said shape to room temperature.

2. A method according to claim 1 wherein the amount of F present is 0.2–0.5 weight percent.

3. A method of manufacturing a high-strength, semi-crystalline ceramic body comprising the steps of melting a batch for a glass composition which, by analysis, consists essentially, by weight, of 65–75% $SiO_2$, 1–4% $Li_2O$, 1–4% $MgO$, 15–25% $Al_2O_3$, 0.5–2.0% $ZnO$, 3–6% $TiO_2$, 0.1–2.0% total of at least one alkali metal oxide of the group consisting of $Na_2O$ and $K_2O$, and 0.1–1.2% F, simultaneously cooling the melt below the transformation point of the melt and shaping a glass body therefrom, thereafter exposing said glass body to a temperature range of about 750°–850° C., maintaining thereat for 0.5–3 hours, thereafter raising the temperature of said body to about 1050°–1090° C., maintaining thereat for about 0.5–2 hours, finally raising the temperature of said body to about 1100°–1200° C., maintaining thereat for 1–16 hours, and then cooling said body to room temperature.

4. A method according to claim 3 wherein the amount of F present is 0.2–0.5 weight percent.

5. A semicrystalline ceramic body consisting essentially of a multiplicity of fine-grained, inorganic crystals dispersed in a glassy matrix, said crystals being formed by crystallization in situ from a glass body consisting essentially, by weight, of 65–75% $SiO_2$, 1–4% $Li_2O$, 1–4% MgO, 15–25% $Al_2O_3$, 0.5–2.0% ZnO, 3–6% $TiO_2$, 0.1–2.0% total of at least one alkali metal oxide of the group consisting of $Na_2O$ and $K_2O$, and 0.1–1.2% F, said glassy matrix consisting essentially of the uncrystallized portion of the glass remaining after crystallization of said crystals.

6. A semicrystalline ceramic body according to claim 5 wherein the amount of F present is 0.2–0.5 weight percent.

References Cited in the file of this patent

UNITED STATES PATENTS

| | | |
|---|---|---|
| 2,779,136 | Hood et al. | Jan. 29, 1957 |
| 2,920,971 | Stookey | Jan. 12, 1960 |
| 3,006,775 | Chen | Oct. 31, 1961 |

OTHER REFERENCES

Hinz-Silikat-Techn., published by German Acad. of Science, vol. 10 (1959), "Vitrokeram," pages 119–122.

UNITED STATES PATENT OFFICE
CERTIFICATE OF CORRECTION

Patent No. 3,148,994                          September 15, 1964

Raymond O. Voss

It is hereby certified that error appears in the above numbered patent requiring correction and that the said Letters Patent should read as corrected below.

Column 1, line 63, for "stlying" read -- styling --; column 2, lines 37 and 38, for "distoration" read -- distortion --; line 41, for "wave" read -- ware --; same column 2, lines 59 and 60, for "uneveness" read -- unevenness --; column 3, line 46, for "1100°—120° C." read -- 1100°—1200° C. --; column 7, Table I, second column, line 3 thereof, for "0.17" read -- 0.07 --; same Table I, sixth column, line 7 thereof, for "1.9" read -- 1.0 --.

Signed and sealed this 20th day of April 1965.

(SEAL)
Attest:

ERNEST W. SWIDER                         EDWARD J. BRENNER
Attesting Officer                          Commissioner of Patents